No. 607,318. Patented July 12, 1898.
W. O. WORTH.
MOTOR VEHICLE.
(Application filed Sept. 22, 1897.)
(No Model.) 5 Sheets—Sheet 2.
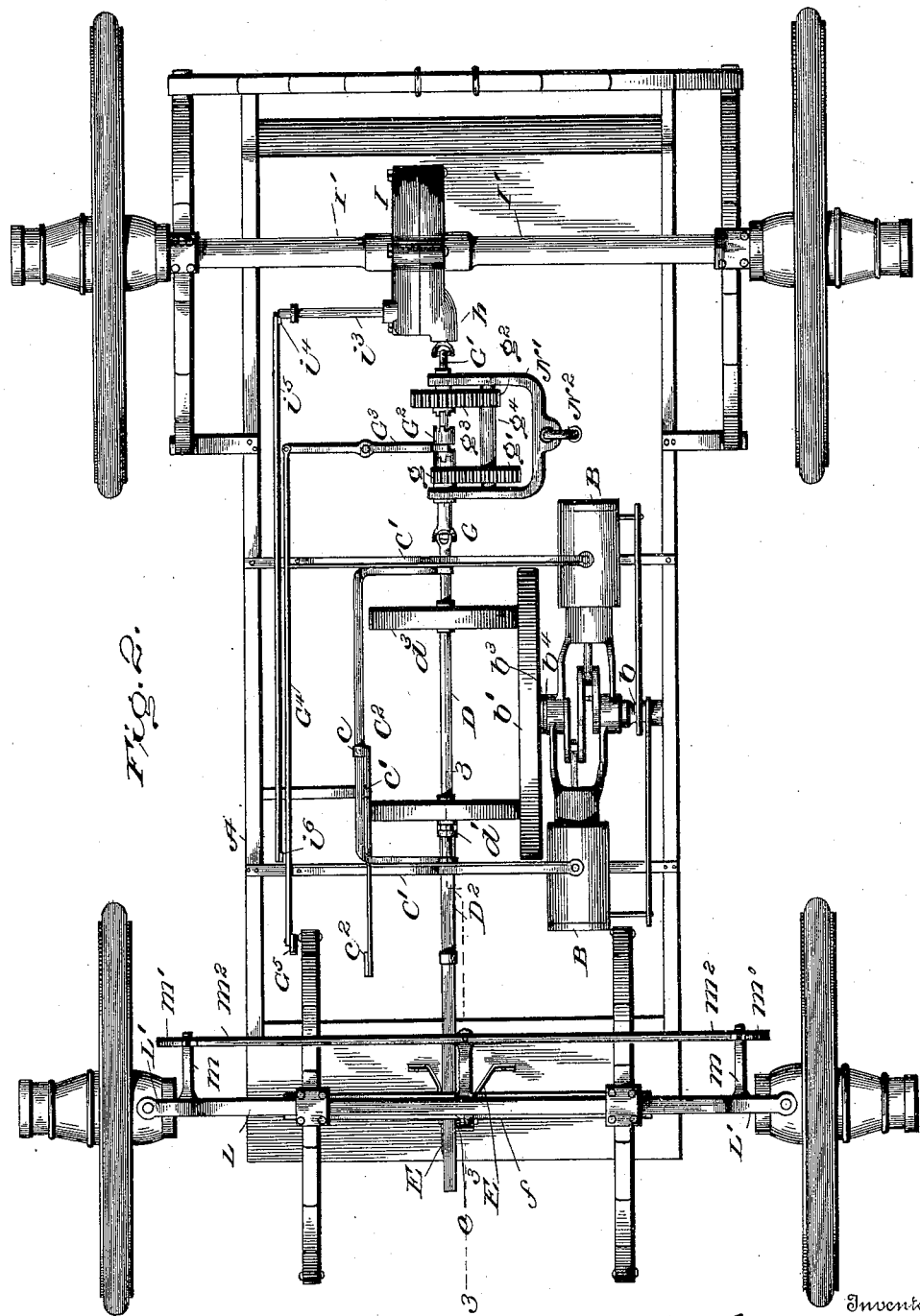

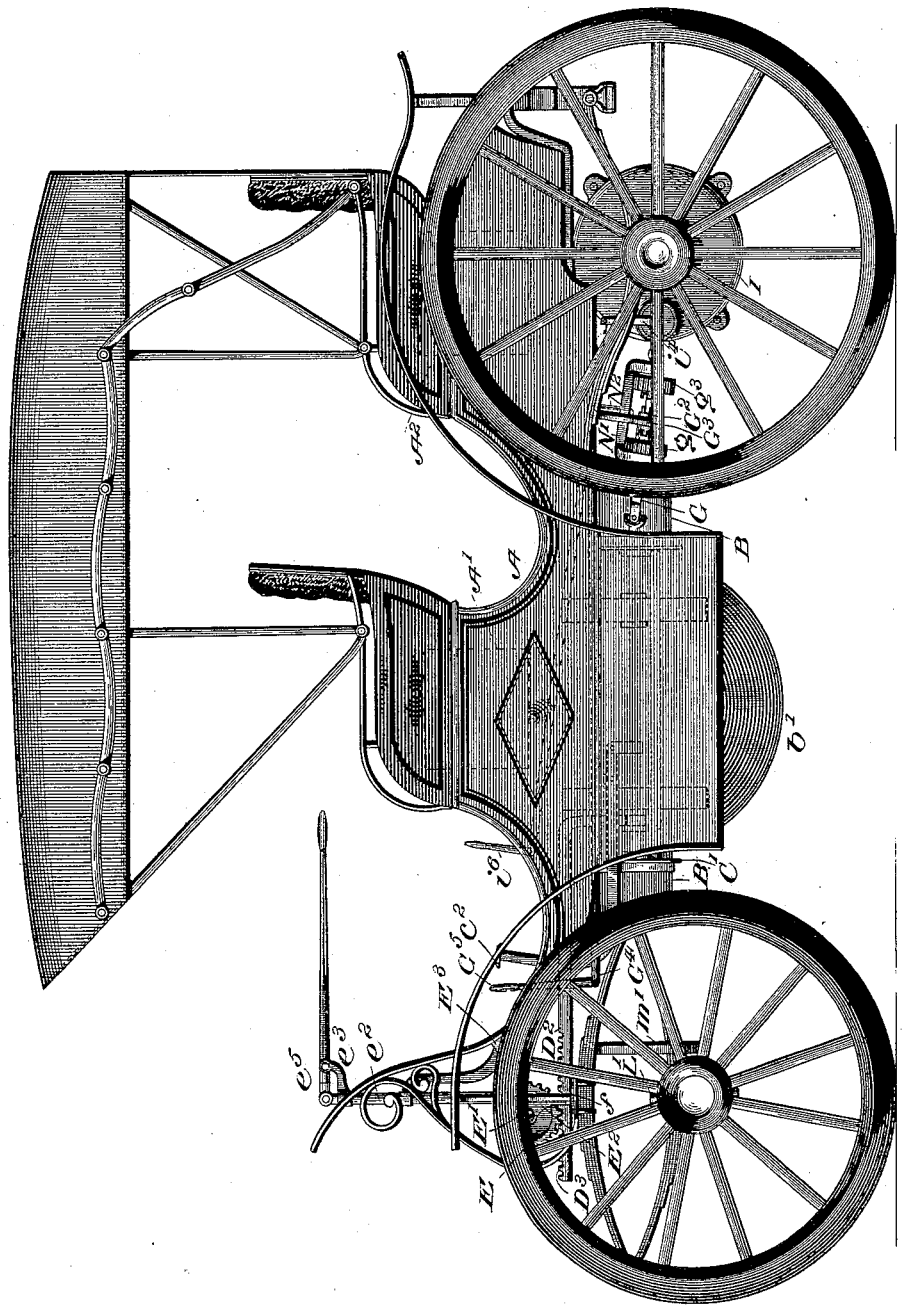

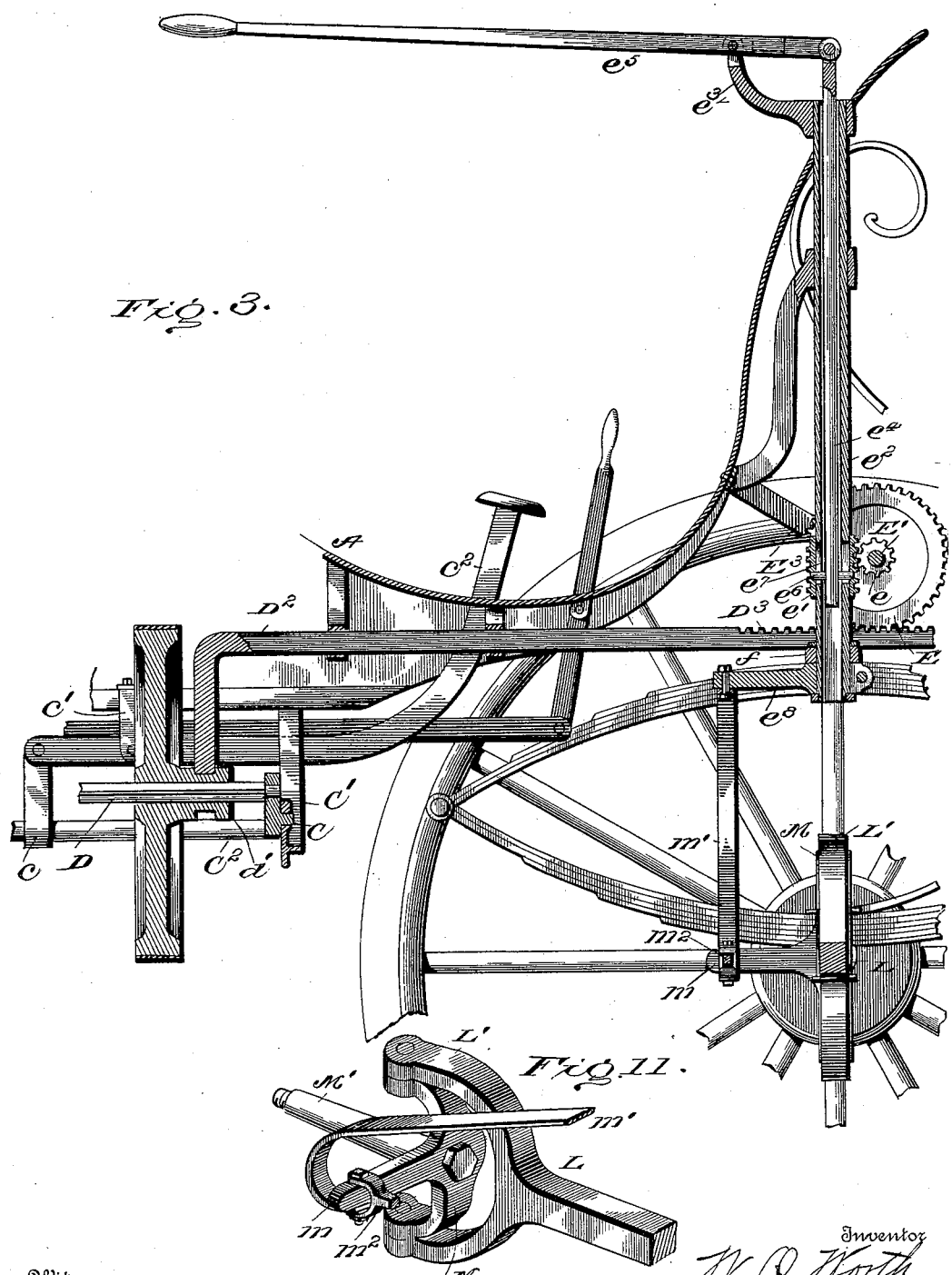

No. 607,318. Patented July 12, 1898.
W. O. WORTH.
MOTOR VEHICLE.
(Application filed Sept. 22, 1897.)
(No Model.) 5 Sheets—Sheet 4.
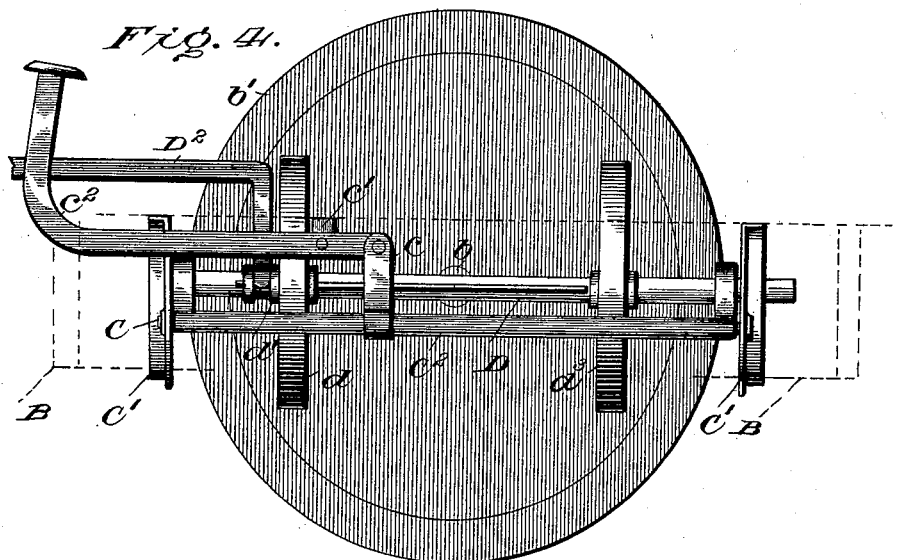
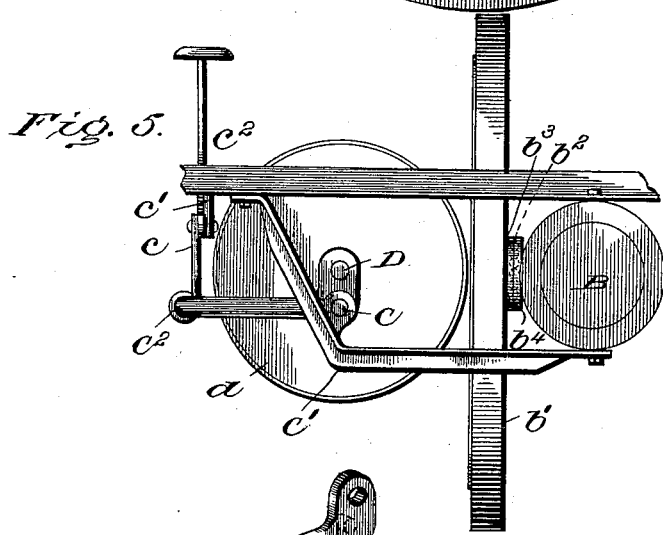
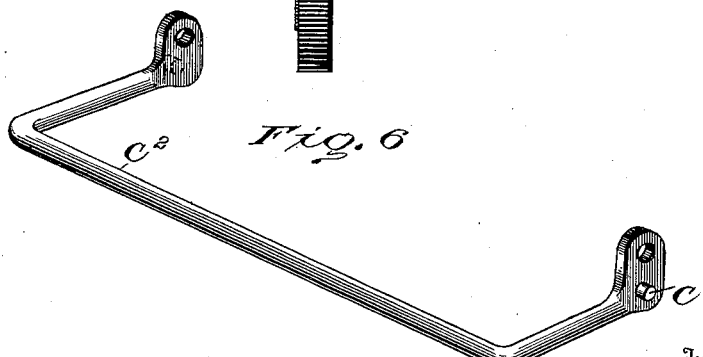
Witnesses
Inventor
W. O. Worth
by Alexander & Dowell
his Attorneys
THE NORRIS PETERS CO., PHOTO-LITHO., WASHINGTON, D. C.

No. 607,318. Patented July 12, 1898.
W. O. WORTH.
MOTOR VEHICLE.
(Application filed Sept. 22, 1897.)
(No Model.) 5 Sheets—Sheet 5.
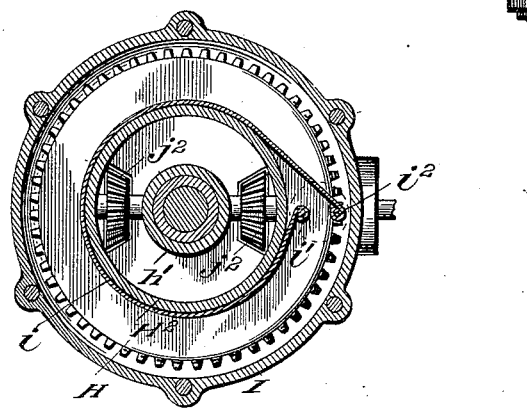
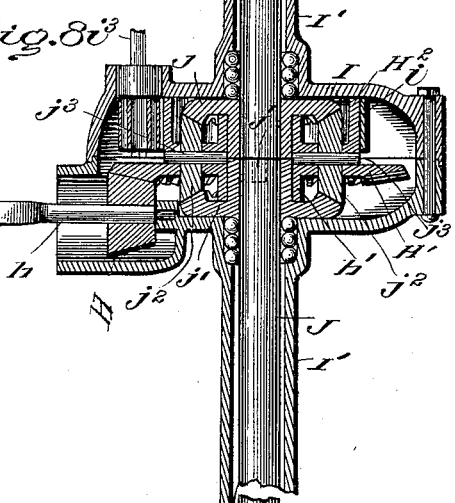
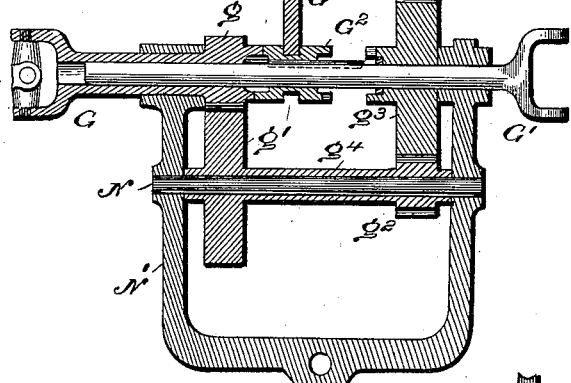
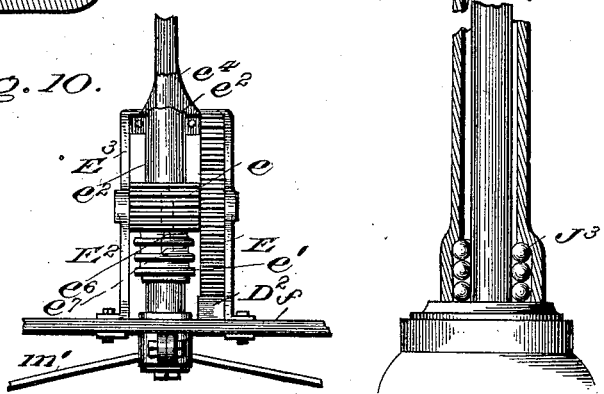
Witnesses
Inventor
W. O. Worth
by Alexander & Powell
his Attorneys

UNITED STATES PATENT OFFICE.

WILLIAM O. WORTH, OF CHICAGO, ILLINOIS, ASSIGNOR OF TWO-THIRDS TO WILLIAM R. DONALDSON, OF LOUISVILLE, KENTUCKY, AND HENRY W. KELLOGG, OF BATTLE CREEK, MICHIGAN.

MOTOR-VEHICLE.

SPECIFICATION forming part of Letters Patent No. 607,318, dated July 12, 1898.

Application filed September 22, 1897. Serial No. 652,612. (No model.)

*To all whom it may concern:*

Be it known that I, WILLIAM O. WORTH, of Chicago, in the county of Cook and State of Illinois, have invented certain new and useful Improvements in Motor-Vehicles; and I hereby declare that the following is a full, clear, and exact description thereof, reference being had to the accompanying drawings, which form part of this specification.

This invention is an improvement in locomotive motor-vehicles or horseless carriages; and its objects are, first, to provide the vehicle with an improved driving mechanism capable of propelling it very rapidly or very slowly or at intermediate speeds with a given speed of the engine and also to provide a multiplying gearing by which the power of the engine can be amplified in its transmission to the driving-wheels, so as to enable the vehicle to ascend heavy grades; second, to provide an improved steering and guiding mechanism, and, third, to provide an improved construction of the rear driven shaft and of the mechanism for operating the same.

The invention consists in the novel construction and combinations of parts, as hereinafter claimed, and the accompanying drawings illustrate an efficient form of motor-vehicle embodying my invention in a practical form.

Referring to said drawings, Figure 1 is a side elevation of a four-seat motor-vehicle. Fig. 2 is an enlarged bottom plan view thereof. Fig. 3 is a vertical longitudinal section on line 3 3, Fig. 2. Fig. 4 is an enlarged elevation of the frictional driving mechanism. Fig. 5 is an edge view of Fig. 4. Fig. 6 is a detail of the friction-gear-shaft hanger. Fig. 7 is an enlarged horizontal section through the telescopic universal connection for transmitting power from the engine to the rear shaft. Fig. 8 is a horizontal longitudinal section through the rear axle of the driving-gearing thereof. Fig. 9 is a transverse section through the driving mechanism on the rear shaft, showing the braking devices. Fig. 10 is an enlarged detail view of the steering and guiding devices, and Fig. 11 is a detail perspective view of one of the front-wheel-supporting yokes.

The body A of the vehicle may be of any desired shape, and as shown resembles a double-seat surrey. Under the front seat may be an oil-tank $A'$ and under the rear seat a water-tank $A^2$. Suspended directly under the bottom of the body in any suitable manner is an engine, preferably a double-acting gasolene-engine having front and rear cylinders B B and transverse main shaft $b$, having diametrically opposite cranks, to which the pitmen are connected, so as to counterbalance. On one end of the shaft $b$ is a heavy friction-disk $b'$, which also serves as a fly-wheel, and is partly hidden beneath the front seat. The construction of the engine and arrangement of storage-tanks for water and oil or gas are not part of the present invention, and I deem it unnecessary to give a more detailed explanation thereof. I do not limit myself either to the use of a fluid-engine, as electric motors might be used, if desired, to drive disk $b'$. On the side of disk $b'$ opposite the engine is a horizontal rock-shaft C, which is journaled in suitable bearings on angle-brackets $C'$, while its ends are bent upward and inward, and in them is journaled a shaft D, running parallel with shaft C, and on shaft D is splined a movable friction-disk $d$, which stands at right angles to the face of disk $b'$ and can be moved to or from the latter by rocking shaft C.

Shaft C can be rocked by means of a foot-lever $c^2$ on a hanger $c'$ and connected at its rear end by a link $c$ to an arm $C^2$ on shaft C, as shown. The front end of lever $c^2$ is bent up in front of the front seat in convenient position for operation by the foot of the driver, so that he can at will throw the friction-disk $d$ against disk $b'$ and hold it thereagainst, thereby imparting motion from shaft $b$ to shaft D, as is evident.

In order to relieve shaft $b$ of the end thrust due to the pressure of disk $d$ against disk $b$ or to lessen the friction due to such thrust, I preferably interpose between the hub of disk $b'$ and the journal-box of shaft $b$ adjoining disk $b'$ antifriction-bearings, comprising, for instance, an annular series of ball-bearings $b^2$. (See Fig. 5.) These may be confined between annular race-plates $b^3$ $b^4$, as shown. Further, to prevent distortion or displacement of disk $b'$ on shaft $b$ because of the pressure of disk $d$ thereagainst I employ an idler-pulley $d^3$, which is loosely mounted on the shaft near the rear edge of disk $b'$ and bears against the latter so as to counterbalance the pressure of disk $d$ against the front side of the disk $b'$.

Disk $d$ is movable longitudinally on shaft D by means of a clutch-rod $D^2$, which embraces a grooved collar $d'$ on the hub of disk $d$ and extends forward through suitable guides to the front end of the carriage, where it is provided with a rack $D^3$, which meshes with a pinion E, keyed on a stud-shaft $E'$, journaled in bracket-irons $E^2$, mounted on a cross-bar $f$, supported on the front-axle springs, said bracket-irons having rearward bifurcations $E^3$, that are fast to the front of the carriage-body, as shown. On stub-shaft $E'$ is also keyed a small pinion $e$, which meshes with a tubular rack $e'$, loosely mounted on the lower end of a vertical rotatable tube $e^2$, which is suitably supported on brackets attached to the bar $f$ and front or dashboard of the body, as shown in the drawings. Within tube $e^2$ is a vertically-movable rod $e^4$, the upper end of which is pivoted to an oscillating lever $e^5$, fulcrumed on an arm $e^3$, attached to the upper end of tube $e^2$, and the lower end of this rod $e^4$ is connected to rack $e'$ by a pin $e^6$, which projects through vertical slots $e^7$ in tube $e^2$, as shown. The rack $e'$ can thus be operated by oscillating lever $e^5$ vertically, and thus the position of disk $d$ relatively to disk $b'$ is under the immediate control of the driver. The shifting of the disk should not be attempted, and obviously could not be effected, until disk $d$ is out of contact with disk $b'$, which is automatically effected when lever $c^2$ is released.

The rear end of shaft D is connected by a universal connection to one end of one member G of a telescoping connection, the other member $G'$ being connected at its rear end by a universal connection to the shaft $h$ of a bevel-pinion H, journaled in a housing I. This housing is divided transversely at center and provided with tubular extensions $I'$, which inclose the members J J of the rear axle, which are united at center, as at $J'$, and respectively provided on their meeting ends with oppositely-facing bevel-gears $j\, j'$, whose hubs abut and are confined within the hub $h'$ of a bevel-gear $H'$, which meshes with the bevel-pinion H, as shown. The gear $H'$ may be provided on its rear face with an annular flange $H^2$, to and around which a brake-band $i$ may be applied, if desired.

As shown, the ends of strap $i$ are connected to diametrically opposite pins $i'\, i^2$ on the end of a stud-shaft $i^3$, journaled in the housing of the gearing, so that by rotating shaft $i^3$ in one direction the brake is applied and in the opposite direction the brake is released. Shaft $i^3$ may be provided with a crank $i^4$, connected by a rod $i^5$ to a foot-lever $i^6$, in convenient position for operation by the driver.

At diametrically opposite points and meshing with both gears $j\, j'$ are bevel-pinions $j^2$, which occupy slots in gear $H'$ and are journaled on radial pins $j^3$, secured in gear $H'$. The object of this construction is to enable either rear wheel to rotate independently of the other, thus enabling the vehicle to make sharp turns. When going straight forward, gears $j^2$ lock gears $j\, j'$ to gear H, and both sections J of the rear axle and the wheels thereon rotate alike, but in turning either wheel can slow up while the other continues to rotate at uniform speed, the bevel-pinions $j^2$ then rolling around the stationary or slowed-up gear $j$ or $j'$. The action of this compensating gear is familiar and needs no further explanation.

The axle-sections J $J'$ are preferably centered and supported in the housings $I'$ upon ball-bearings $J^3$, as indicated in Fig. 8, and the rear wheels are fixed upon the axle-sections in any suitable manner, so as to be positively rotated thereby.

It will of course be understood that the face of disk $b'$ or the periphery of disk $d$, or both, should be formed of or covered with some durable frictional material, such as are known in the art.

The rear end of the body is supported upon the housings of the rear axles by any suitable arrangement of springs—as, for example, illustrated in the drawings. The front end of the body is also supported by suitable springs—for example, as shown upon the front axle. Preferably I swivel the spindles upon the front axles L, so as to dispense with king-bolts and keep the main body of the axle rigid relatively to the body. The ends of axle L are formed into vertical yokes $L'$, within which are pivoted smaller yokes M, capable of turning horizontally, and to the centers of said yokes are bolted the spindles $M'$, which can be somewhat like bicycle-pedals, and are bolted to the cranks, so that the spindles can be easily replaced, if broken. The front wheels are journaled on the spindles, as usual.

The yokes M are provided with horizontal rearwardly-extending arms $m$, to which are attached the ends of spring-rods $M'$, which are preferably fastened under the arms, then bent out, up, and over the ends of the arm, and extend inward under the body and are fastened to rearwardly-projecting arm $e^8$ on the lower end of tube $e^2$. (See Fig. 3.) Therefore by turning sleeve $e^2$ in its bearings the yokes M are turned so that by simply swinging lever $e^5$ to right or left the driver can guide the vehicle. The arms $m$ of the yokes are also connected by a tie-rod $m^2$, so that the front wheels will keep together in turning and not strain their connection with tube $e^2$.

The spring-rods $m'$ compensate for deflections or movements of the body relatively to the axle, either horizontally or vertically and prevent strain on the steering devices.

The whole machine is under the immediate control of one man, it is guided by swinging lever $e^5$ horizontally, and the speed is regulated by raising or lowering the same lever $e^5$ and by pressing or releasing lever $c^2$.

The operation will be so clear from the foregoing description and drawings that it is needless to repeat it here.

In order to amplify the power as applied to the rear axle to enable the vehicle to climb heavy grades with an engine of small power, the amplifying mechanism shown more particularly in Fig. 7 can be employed.

The telescoping connection consists, as shown, of a tubular part G and a rod $G'$, fitted therein. On the rear extremity of part G is attached a small pinion $g$, meshing with a gear $g'$ on one end of a sleeve $g^4$, journaled on a shaft N, fixed in a yoke $N'$, whose bifurcations respectively embrace the parts G $G'$, as shown, so as to suspend the yoke thereon, while its outer end is suspended by a bolt $N^2$ or other suitable means from the body, so that the yoke is prevented from rotating, although allowed to vary its position or vibrate with the connection G $G'$. On the rear end of sleeve $g^4$ is a pinion $g^2$, which meshes with a gear $g^3$, loosely journaled on part $G'$, as shown. A clutch-block $G^2$ is splined on part $G'$ intermediate gear $g^3$ and pinion $g$ and its opposite ends are adapted to engage interlocking clutch-faces on the ends of gear $g^3$ or pinion $g$, respectively, but when engaged with one it is disengaged from the other. The clutch $G^2$ can be shifted by means of a lever $G^3$, rod $G^4$, and hand-lever $G^5$, the latter being in convenient position for operation by the driver. Ordinarily the clutch will be kept in engagement with pinion $g$, thereby locking parts G $G'$ directly together, so that they rotate as one piece, while gear $g^3$ is rotated only on part $G'$. When a heavy grade is to be overcome, the clutch $G^2$ is shifted into engagement with gear $g^3$, locking it to part $G'$, and then the power is transmitted from G to $G'$ through gears $g$ $g'$ $g^2$ $g^3$, greatly reducing the speed of $G'$, but proportionately amplifying the power.

The vehicle thus described is simple, efficient, practicable, and speedy, and has been practically operated by me.

By shifting disk $d$ to the rear side of disk $b'$ the vehicle $c$ can be backed up, because the motion of shaft D will then be reversed, although the engine runs constantly in one direction. By shifting the disk $d$ to center of disk $d'$ it will act as a brake to arrest the motion of the carriage, although for quick work the brake $i$, above described, could be employed effectively.

In practice the housings I $I'$ of the gears and rear-axle sections are filled with a suitable lubricant and sealed up, so that the parts are perfectly lubricated and dust excluded and they will not require attention for long periods of time.

Having thus described my invention, what I therefore claim as new, and desire to secure by Letters Patent thereon, is—

1. In a motor-vehicle the combination of the driven shaft, the rear axle and the gearing for driving the same, with the mechanism for transmitting variable motion from the driven shaft to said gearing, consisting of the sectional shaft, a fixed pinion on one section of the shaft, and a loose gear on the other section thereof, the amplifying gearing between said pinion and loose gear, and the clutch splined on that section of the shaft carrying loose gear and adapted to be shifted into engagement either with the pinion or the said loose gear for the purpose and substantially as described.

2. In a motor-vehicle the combination of the rear axle made in sections, wheels on the outer ends thereof, opposite bevel-gears on the inner ends of said sections; a large bevel-gear intermediate said opposite beveled gears, diametrically opposite pinions journaled in slots in said large bevel-gear and meshing with both said opposite bevel-gears, and a bevel-pinion meshing with said large bevel-gear; with a sectional housing inclosing all said gears and provided with tubular extensions inclosing and supporting the axles, said axles having antifriction-bearings in said tubular extensions, for the purpose and substantially as described.

3. In a motor-vehicle the combination of the main disk driven by the engine, a shaft lying parallel with the outer face of said disk and movable toward or from the same, a second disk on said shaft, and means for moving said shaft so as to cause the disks to contact or separate; with an idler pulley or wheel also mounted on the said shaft and adapted to counteract the pressure of the second disk against the main disk, substantially as described.

4. In a motor-vehicle the combination of the main disk, means for rotating it; a second disk adjustably mounted upon a shaft lying beside the main disk, mechanism for moving said shaft and disk thereon toward or from the main disk, and mechanism for shifting the disk longitudinally upon said shaft, with an idler pulley or wheel also mounted on the said shaft and adapted to counteract the pressure of the second disk against the main disk, substantially as described.

5. In a motor-vehicle the combination of the main friction-disk and mechanism for driving the same, with a rock-shaft lying beside the disk having its ends bent inward, a second or driven shaft journaled in the ends of said rock-shaft, a friction-disk splined on said driven shaft and adapted to contact the face of the main disk, the levers and connections for rocking said shaft, and mechanism for shifting said disk longitudinally upon the driven shaft; with mechanism for transmitting motion from said driven shaft to the axles or wheels, substantially as described.

6. In a motor-vehicle the combination of the driving-shaft, and the adjustable gear or disk thereon, with means for shifting said gear longitudinally on said shaft, comprising a rack-bar, a gear meshing therewith, a vertical tube, a tubular rack thereon meshing with a pinion beside said gear, and a vertically-movable rod in said tube connected with said tubular rack by a pin passed through slots in the tube, all substantially as and for the purpose described.

7. In a motor-vehicle the combination with the power mechanism, and the steering mechanism of the controlling devices comprising a rotatable tube, having an arm on its lower end connected to the steering mechanism, a vertically-movable rod within said tube, a tubular rack exterior to the tube connected to said rod by pins projecting through slots in the tube, and gearing operated by said tubular rack controlling the power mechanism, with a lever fulcrumed on a bracket on said tube and pivoted to the said rod, whereby the rod may be raised or lowered, or the tube rotated separately or together, for the purpose and substantially as described.

8. In a motor-vehicle the combination of the front axle, the spindles pivoted thereto, and the steering-arms projecting from said spindles with the rotatable steering-arm, and the spring-rods connecting said spindle-arms to said steering-arm, for the purpose and substantially as described.

9. In a motor-vehicle the combination of the front axle, the yokes pivoted thereto having spindles for the wheels and steering-arms, substantially as described; with the rotatable steering-post, having a crank-arm on its lower end, and the spring-rods connecting said crank-arm to said steering-arms, for the purpose and substantially as described.

In testimony that I claim the foregoing as my own I affix my signature in presence of two witnesses.

WILLIAM O. WORTH.

In presence of—
JAMES R. MANSFIELD,
T. H. ALEXANDER.